US011880952B2

(12) United States Patent
Xia et al.

(10) Patent No.: US 11,880,952 B2
(45) Date of Patent: Jan. 23, 2024

(54) VIEW (FOV) IN THREE-DIMENSIONAL VIRTUAL REALITY (VR) SCENE

(71) Applicant: Dalian University of Technology, Dalian (CN)

(72) Inventors: Qiufen Xia, Dalian (CN); Zhuangze Hou, Dalian (CN); Zichuan Xu, Dalian (CN)

(73) Assignee: Dalian University of Technology, Dalian (CN)

( * ) Notice: Subject to any disclaimer, the term of this patent is extended or adjusted under 35 U.S.C. 154(b) by 75 days.

(21) Appl. No.: 17/864,780

(22) Filed: Jul. 14, 2022

(65) Prior Publication Data
US 2023/0360335 A1 Nov. 9, 2023

(30) Foreign Application Priority Data

May 7, 2022 (CN) .......................... 202210491553.6

(51) Int. Cl.
*G06T 19/00* (2011.01)
(52) U.S. Cl.
CPC ...... *G06T 19/006* (2013.01); *G06T 2219/008* (2013.01)
(58) Field of Classification Search
None
See application file for complete search history.

(56) References Cited

U.S. PATENT DOCUMENTS

| | | | |
|---|---|---|---|
| 2016/0267720 A1* | 9/2016 | Mandella | G06F 3/03545 |
| 2017/0358141 A1* | 12/2017 | Stafford | G06T 11/60 |
| 2021/0125414 A1* | 4/2021 | Berkebile | G06F 3/017 |

OTHER PUBLICATIONS

Fernandes et al.; "Combating VR Sickness through Subtle Dynamic Field-Of-View Modification;" IEEE Symposium on 3D User Interfaces 2016, pp. 201-210 (Year: 2016).*

* cited by examiner

*Primary Examiner* — Edward Martello
(74) *Attorney, Agent, or Firm* — Maine Cernota & Curran

(57) ABSTRACT

The disclosure discloses a method and system for adjusting user field of view (FoV) in a three-dimensional virtual reality (VR) scene. The method includes: acquiring two consecutive frames of scene pictures during a period of a user experiencing a VR scene by using a VR device; determining a projected scene flow vector on the basis of the two consecutive frames of scene pictures; generating a virtual scene graph of the two consecutive frames of scene pictures; determining a projected scene flow value of the virtual scene graph on the basis of the projected scene flow vector; determining a peripheral vision pixel of the virtual scene graph; calculating a projected scene flow average value of the peripheral vision pixel on the basis of the projected scene flow value of the virtual scene graph; and dynamically adjust a FoV of the user on the basis of the projected scene flow average value.

6 Claims, 2 Drawing Sheets

VIEW (FOV) IN THREE-DIMENSIONAL
VIRTUAL REALITY (VR) SCENE

CROSS REFERENCE TO RELATED APPLICATION

This patent application claims the benefit and priority of Chinese Patent Application No. 202210491553.6, filed on May 7, 2022, the disclosure of which is incorporated by reference herein in its entirety as part of the present application.

TECHNICAL FIELD

The present disclosure relates to the technical field of virtual reality (VR) perception, and in particular, to a method and system for adjusting user field of view (FoV) in a three-dimensional VR scene.

BACKGROUND ART

Virtual reality (VR) technology is a simulation technology that generates a virtual environment by using a computer, and can be applied to multiple fields such as military, medical, education, and design. VR is also an important technology for future development of metaverse.

However, visually induced motion sickness (VIMS) is a main factor affecting popularization of VR devices, which will cause nausea, sweating, dizziness, and other symptoms. One of main reasons for the VIMS is a visual vestibular conflict caused by a difference between motion flow in peripheral vision of a user and an actual physical motion of the user, and one way to reduce this conflict is to block the motion flow visible to the peripheral vision of the user and reduce a field of view (FoV) of the user.

Although the VIMS can be alleviated by reducing the FoV, the FoV cannot be dynamically adjusted, and there is no more accurate variable to balance the size of the FoV, which will greatly reduce the presence of the user in the process of alleviating the VIMS.

SUMMARY

An objective of the present disclosure is to provide a method and system for adjusting user field of view (FoV) in a three-dimensional VR scene, to dynamically adjust a FoV of a user.

To achieve the above objective, the present disclosure provides the following solutions:

A method for adjusting user field of view (FoV) in a three-dimensional VR scene includes:
  acquiring two consecutive frames of scene pictures during a period of a user experiencing a VR scene by using a VR device;
  determining a projected scene flow vector on the basis of the two consecutive frames of scene pictures;
  generating a virtual scene graph of the two consecutive frames of scene pictures;
  determining a projected scene flow value of the virtual scene graph on the basis of the projected scene flow vector;
  determining a peripheral vision pixel of the virtual scene graph;
  calculating a projected scene flow average value of the peripheral vision pixel on the basis of the projected scene flow value of the virtual scene graph; and
  dynamically adjusting a user FoV on the basis of the projected scene flow average value, a maximum value of the projected scene flow average value corresponding to a smallest user FoV, and a minimum value of the projected scene flow average value corresponding to a largest user FoV.

Optionally, the step of determining a projected scene flow vector on the basis of the two consecutive frames of scene pictures includes:
  determining, on the basis of the two consecutive frames of scene pictures, a camera pose vector and an optical flow vector generated by an autonomous motion of an object in the scene pictures; and
  determining the projected scene flow vector on the basis of the camera pose vector and the optical flow vector.

Optionally, the step of determining a projected scene flow value of the virtual scene graph on the basis of the projected scene flow vector includes:
  taking modulo of the projected scene flow vector, and converting same into a texture value; and
  assigning the texture value to the virtual scene graph, the texture value of each pixel in the virtual scene graph representing a projected scene flow value of a corresponding pixel.

Optionally, the step of determining a peripheral vision pixel of the virtual scene graph includes:
  taking a center pixel of the virtual scene graph as a start point; and
  determining a pixel of which a distance from the start point is greater than a set peripheral vision radius as the peripheral vision pixel.

Optionally, the step of calculating a projected scene flow average value of the peripheral vision pixel on the basis of the projected scene flow value of the virtual scene graph includes:
  determining a projected scene flow value of the peripheral vision pixel on the basis of the projected scene flow value of the virtual scene graph; and
  averaging the projected scene flow value of the peripheral vision pixel to obtain the projected scene flow average value of the peripheral vision pixel.

The present disclosure also provides a system for adjusting user field of view (FoV) in a three-dimensional VR scene includes:
  a scene picture acquisition module configured to acquire two consecutive frames of scene pictures during a period of a user experiencing a VR scene by using a VR device;
  a projected scene flow vector determination module configured to determine a projected scene flow vector on the basis of the two consecutive frames of scene pictures;
  a virtual scene graph generation module configured to generate a virtual scene graph of the two consecutive frames of scene pictures;
  a projected scene flow value calculation module configured to determine a projected scene flow value of the virtual scene graph on the basis of the projected scene flow vector;
  a peripheral vision pixel determination module configured to determine a peripheral vision pixel of the virtual scene graph;
  a projected scene flow average value calculation module configured to calculate a projected scene flow average value of the peripheral vision pixel on the basis of the projected scene flow value of the virtual scene graph; and a user FoV adjustment module configured to dynamically adjust a user FoV on the basis of the projected scene flow average value, a maximum value of the projected scene flow average value corresponding to a smallest user FoV, and a minimum value of the projected scene flow average value corresponding to a largest user FoV.

According to the specific embodiments provided by the present disclosure, the present disclosure discloses the following technical effects:

The present disclosure can alleviate VIMS of the user by acquiring the scene pictures observed by the user when using the VR device, calculating the average projected scene flow, and dynamically adjusting the FoV of the user. The present disclosure is more suitable for a scene flow in the three-dimensional VR scene, which can well guarantee the presence of the user in the virtual scene and enhance the experience of the user using the VR device.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method and system for adjusting user field of view (FoV) in a three-dimensional VR scene, to dynamically adjust a FoV of a user.

To make the above-mentioned objective, features, and advantages of the present disclosure clearer and more comprehensible, the present disclosure will be further described in detail below in conjunction with the accompanying drawings and specific embodiments.

Figure 1:
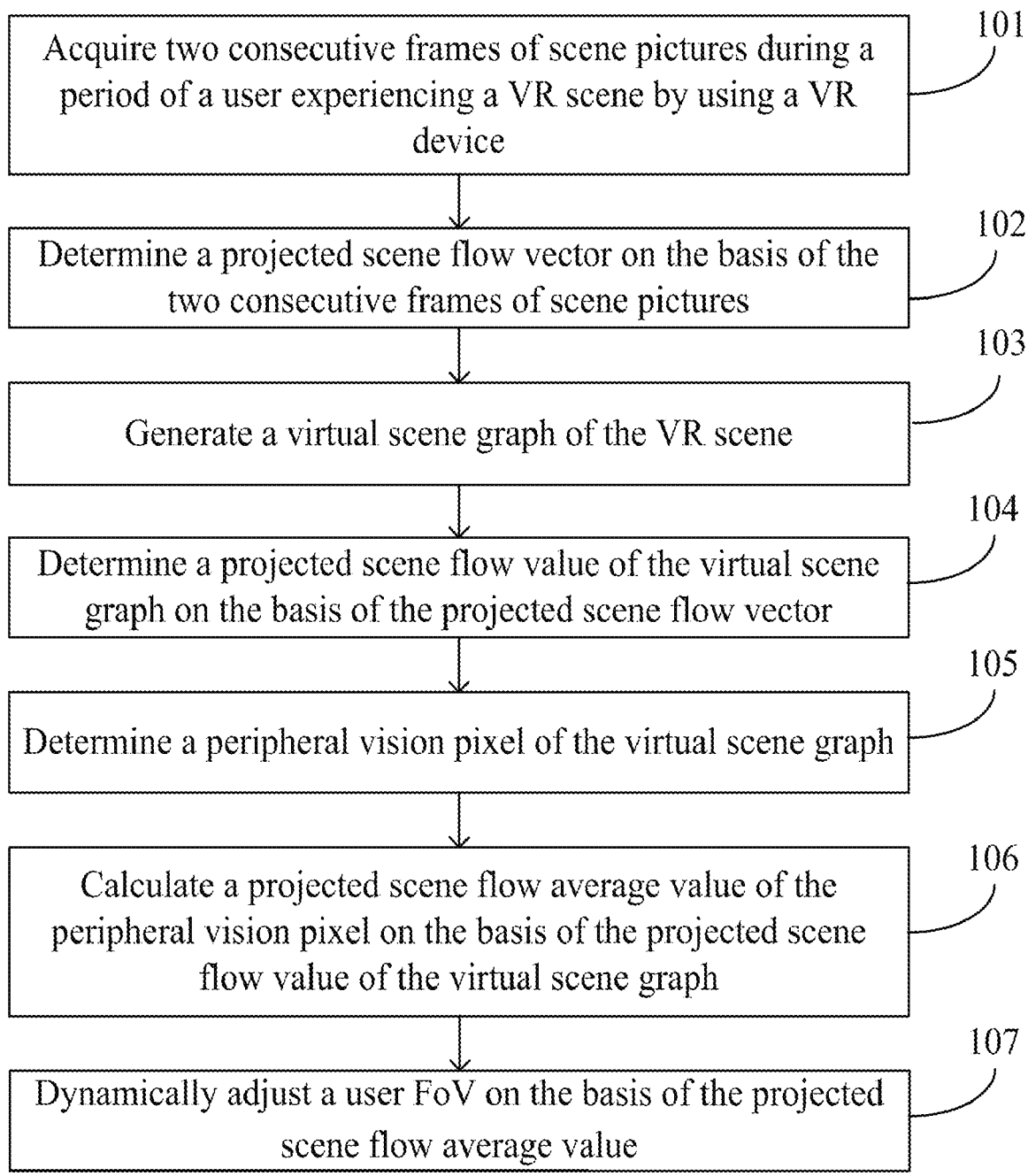
FIG. 1 is a flow diagram of a method for adjusting user field of view (FoV) in a three-dimensional VR scene according to one embodiment of the present disclosure.

As shown in FIG. 1, the method for adjusting user field of view (FoV) in a three-dimensional VR scene provided by the present disclosure includes the following steps:

Step 101: acquire two consecutive frames of scene pictures during a period of a user experiencing a VR scene by using a VR device.

When the scene pictures of the observed VR scene are obtained, this step further includes: setting initial resolutions of the obtained pictures; and processing the obtained pictures, reducing the resolutions, and guaranteeing the speed of calculation.

Step 102: determine a projected scene flow vector on the basis of the two consecutive frames of scene pictures. This step includes:

sub-step 1021: determining, on the basis of the two consecutive frames of scene pictures, a camera pose vector and an optical flow vector generated by an autonomous motion of an object in the scene pictures; and sub-step 1022: determining the projected scene flow vector on the basis of the camera pose vector and the optical flow vector.

Figure 2:
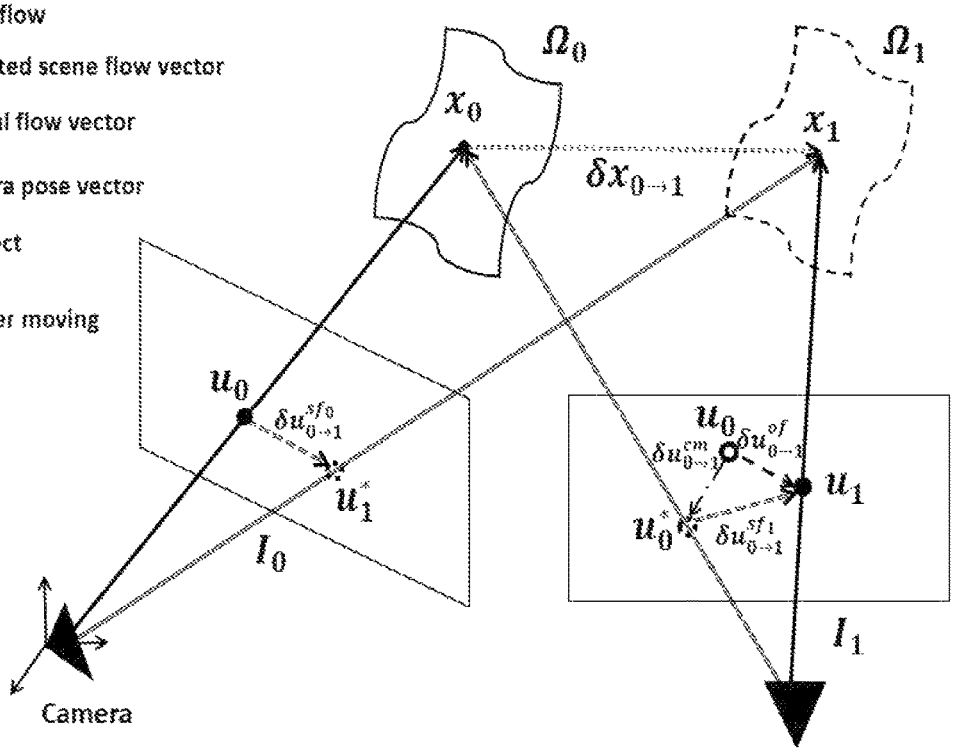
FIG. 2 is a schematic diagram of calculation of a projected scene flow according to one embodiment of the present disclosure.

As shown in FIG. 2, X is an exemplary object; $\Omega_0$ and $\Omega_1$ are states of the exemplary object at a first frame and a second frame; $x_0$ and $x_1$ are three-dimensional positions of the exemplary object at the first frame and the second frame; and $\delta x_{0 \to 1}$ is a scene flow of the exemplary object moving from $x_0$ to $x_1$.

$I_0$ and $I_1$ are imaging planes of a video camera at two different positions; $u_0$ and $u_1{}^*$ are projection positions of X on $I_0$ at $\Omega_0$ and $\Omega_1$; and when the position of the video camera remains unchanged, the projected scene flow is $\delta u_{0 \to 1}{}^{sf0}$.

When the position of the video camera changes, if the camera is at $\Omega_0$, the imaging plane is $I_0$, and if the camera is at $\Omega_1$, the imaging plane is $I_1$, and the position of $u_0$ on $I_1$ and the position of $u_0$ on $I_0$ are the same; $u_0{}^*$ is an actual projection of X on $I_1$ if at $\Omega_0$; $\delta u_{0 \to 1}{}^{of}$ is an optical flow vector; $\delta u_{0 \to 1}{}^{sf1}$ is a projected scene flow vector; and $\delta u_{0 \to 1}{}^{cm}$ is a camera pose flow.

As shown in FIG. 2, the camera moves to produce new motion flow, such that the projected scene flow changes; and the calculation method of the projected scene flow can be regarded as:

$$\delta u_{0 \to 1}{}^{of} - \delta u_{0 \to 1}{}^{cm} = \delta u_{0 \to 1}{}^{sf1} \qquad (1)$$

Step 103: generate a virtual scene graph of the two consecutive frames of scene pictures.

Step 104: determine a projected scene flow value of the virtual scene graph on the basis of the projected scene flow vector.

Modulo is taken for the projected scene flow vector corresponding to each pixel and converted into a texture value, and the texture is assigned to a corresponding pixel in the virtual scene graph, where the texture value of each pixel can represent a projected scene flow value of the pixel.

Step 105: determine a peripheral vision pixel of the virtual scene graph.

Specifically, a center pixel of each picture is set as a start point; and distances of all the other pixels reaching the start point are calculated. The peripheral vision radius is set to determine whether the pixels are on peripheral vision; and according to the range of human peripheral vision, the peripheral vision is set to be 4/5 of a distance of the pixel farthest from the start point. Each pixel is traversed, and a distance thereof from the start point is calculated. The pixel of which a distance is greater than the peripheral vision radius is the peripheral vision pixel, and the part of the picture with the peripheral vision pixel is the peripheral vision.

The step of calculating a distance between each pixel and the start point includes:

setting coordinates of the start point as (0, 0), the centers of other pixel squares being coordinates of pixel squares, and the length, width and height of each pixel being all regarded as 1; and calculating the distance between each pixel and the start point through a distance between two points.

Step 106: calculate a projected scene flow average value of the peripheral vision pixel on the basis of the projected scene flow value of the virtual scene graph.

Calculating an average projected scene flow only considers the projected scene flow of the peripheral vision pixel; and a projected scene flow value of the peripheral vision pixel is determined on the basis of the projected scene flow value of the virtual scene graph. A sum of projected scene flow values of all peripheral vision pixels is calculated, and then averaging is performed to obtain the projected scene flow average value of the peripheral vision pixel.

Step 107: dynamically adjust a user FoV on the basis of the projected scene flow average value.

A maximum value of the projected scene flow average value is set to correspond to a smallest FoV; a minimum value of the projected scene flow average value is set to correspond to a largest FoV; and the average projected scene flow value within the range of the maximum value and the minimum value is linearly interpolated to calculate the corresponding FoV.

The range of the projected scene flow average value is set to be 0-2, and the corresponding FoV is: the maximum FoV of the VR device to the maximum FoV of the VR device×4/5.

The present disclosure proposes to use the projected scene flow as a benchmark for dynamically adjusting the FoV. Compared with two-dimensional optical flow, the projected scene flow can better describe a scene motion in the three-dimensional VR scene. Compared with the scene flow, the projected scene flow is easier to calculate. Dynamically adjusting the FoV can alleviate the VIMS and preserve the presence. Using the projected scene flow is more suitable for a three-dimensional scene, and can better preserve the presence of the user.

The present disclosure also provides a system for adjusting user field of view (FoV) in a three-dimensional VR scene, including:

a scene picture acquisition module configured to acquire two consecutive frames of scene pictures during a period of a user experiencing a VR scene by using a VR device;

a projected scene flow vector determination module configured to determine a projected scene flow vector on the basis of the two consecutive frames of scene pictures;

a virtual scene graph generation module configured to generate a virtual scene graph of the two consecutive frames of scene pictures;

a projected scene flow value calculation module configured to determine a projected scene flow value of the virtual scene graph on the basis of the projected scene flow vector;

a peripheral vision pixel determination module configured to determine a peripheral vision pixel of the virtual scene graph;

a projected scene flow average value calculation module configured to calculate a projected scene flow average value of the peripheral vision pixel on the basis of the projected scene flow value of the virtual scene graph; and a user FoV adjustment module configured to dynamically adjust a user FoV on the basis of the projected scene flow average value, a maximum value of the projected scene flow average value corresponding to a smallest user FoV, and a minimum value of the projected scene flow average value corresponding to a largest user FoV.

Each example of the present specification is described in a progressive manner, each example focuses on the difference from other examples, and the same and similar parts between the examples may refer to each other. Since the system disclosed in one embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A method for adjusting user field of view (FoV) in a three-dimensional virtual reality (VR) scene, comprising:
    acquiring two consecutive frames of scene pictures during a period of a user experiencing a VR scene by using a VR device;
    determining a projected scene flow vector on the basis of the two consecutive frames of scene pictures;
    generating a virtual scene graph of the two consecutive frames of scene pictures;
    determining a projected scene flow value of the virtual scene graph on the basis of the projected scene flow vector;
    determining a peripheral vision pixel of the virtual scene graph;
    calculating a projected scene flow average value of the peripheral vision pixel on the basis of the projected scene flow value of the virtual scene graph; and
    dynamically adjusting a user FoV on the basis of the projected scene flow average value, a maximum value of the projected scene flow average value corresponding to a smallest user FoV, and a minimum value of the projected scene flow average value corresponding to a largest user FoV.

2. The method for adjusting user field of view (FoV) in a three-dimensional VR scene according to claim 1, wherein the step of determining a projected scene flow vector on the basis of the two consecutive frames of scene pictures comprises:
    determining, on the basis of the two consecutive frames of scene pictures, a camera pose vector and an optical flow vector generated by an autonomous motion of an object in the scene pictures; and
    determining the projected scene flow vector on the basis of the camera pose vector and the optical flow vector.

3. The method for adjusting user field of view (FoV) in a three-dimensional VR scene according to claim 1, wherein the step of determining a projected scene flow value of the virtual scene graph on the basis of the projected scene flow vector comprises:
    taking modulo of the projected scene flow vector, and converting same into a texture value; and
    assigning the texture value to the virtual scene graph, the texture value of each pixel in the virtual scene graph representing a projected scene flow value of a corresponding pixel.

4. The method for adjusting user field of view (FoV) in a three-dimensional VR scene according to claim 1, wherein the step of determining a peripheral vision pixel of the virtual scene graph comprises:

taking a center pixel of the virtual scene graph as a start point; and determining a pixel of which a distance from the start point is greater than a set peripheral vision radius as the peripheral vision pixel.

5. The method for adjusting user field of view (FoV) in a three-dimensional VR scene according to claim 1, wherein the step of calculating a projected scene flow average value of the peripheral vision pixel on the basis of the projected scene flow value of the virtual scene graph comprises:

determining a projected scene flow value of the peripheral vision pixel on the basis of the projected scene flow value of the virtual scene graph; and averaging the projected scene flow value of the peripheral vision pixel to obtain the projected scene flow average value of the peripheral vision pixel.

6. A system for adjusting user field of view (FoV) in a three-dimensional VR scene, comprising:

a scene picture acquisition module configured to acquire two consecutive frames of scene pictures during a period of a user experiencing a VR scene by using a VR device;

a projected scene flow vector determination module configured to determine a projected scene flow vector on the basis of the two consecutive frames of scene pictures;

a virtual scene graph generation module configured to generate a virtual scene graph of the two consecutive frames of scene pictures;

a projected scene flow value calculation module configured to determine a projected scene flow value of the virtual scene graph on the basis of the projected scene flow vector;

a peripheral vision pixel determination module configured to determine a peripheral vision pixel of the virtual scene graph;

a projected scene flow average value calculation module configured to calculate a projected scene flow average value of the peripheral vision pixel on the basis of the projected scene flow value of the virtual scene graph; and a user FoV adjustment module configured to dynamically adjust a user FoV on the basis of the projected scene flow average value, a maximum value of the projected scene flow average value corresponding to a smallest user FoV, and a minimum value of the projected scene flow average value corresponding to a largest user FoV.

* * * * *